United States Patent
Jang et al.

(10) Patent No.: US 9,318,276 B2
(45) Date of Patent: Apr. 19, 2016

(54) ELECTRODE COMPOSITION FOR SUPERCAPACITOR, ELECTRODE INCLUDING CURED MATERIAL, AND SUPERCAPACITOR INCLUDING ELECTRODE

(71) Applicant: KOREA INSTITUTE OF MACHINERY & MATERIALS, Daejeon (KR)

(72) Inventors: Yunseok Jang, Daejeon (KR); Jeong Dai Jo, Daejeon (KR); Kwang-Young Kim, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 220 days.

(21) Appl. No.: 14/091,990

(22) Filed: Nov. 27, 2013

(65) Prior Publication Data

US 2014/0293508 A1   Oct. 2, 2014

(30) Foreign Application Priority Data

Apr. 1, 2013   (KR) .......................... 10-2013-0035016

(51) Int. Cl.
*H01G 11/38* (2013.01)
*H01G 11/86* (2013.01)

(52) U.S. Cl.
CPC ............... *H01G 11/86* (2013.01); *H01G 11/38* (2013.01); *Y02E 60/13* (2013.01)

(58) Field of Classification Search
CPC ..................................................... H01G 11/38
See application file for complete search history.

(56) References Cited

U.S. PATENT DOCUMENTS

| | | | |
|---|---|---|---|
| 6,995,970 B2 | 2/2006 | Katai et al. | |
| 7,355,839 B2 | 4/2008 | Yoneda et al. | |
| 7,864,508 B2 | 1/2011 | Fukumine | |
| 7,948,738 B2 | 5/2011 | Shimamoto et al. | |
| 2009/0325069 A1* | 12/2009 | Anada | C09J 123/147 429/217 |
| 2012/0121981 A1 | 5/2012 | Harimoto et al. | |
| 2013/0038984 A1 | 2/2013 | Kim et al. | |
| 2013/0058008 A1* | 3/2013 | Kim | H01G 11/32 361/500 |
| 2014/0193709 A1* | 7/2014 | Okada | H01M 4/622 429/211 |

FOREIGN PATENT DOCUMENTS

| | | | |
|---|---|---|---|
| JP | 10-255806 | 9/1998 | |
| JP | 2013-42129 | 2/2013 | |
| KR | 10-2005-0067025 | 6/2005 | |
| KR | 10-2006-0116166 | 11/2006 | |
| KR | 10-2007-0116039 | 12/2007 | |
| KR | 10-2007-0116129 | 12/2007 | |
| KR | 10-2012-0055565 | 5/2012 | |
| KR | 10-2003-0026790 | 3/2013 | |
| WO | WO2012176895 | * 12/2012 | ............. H01M 4/62 |

* cited by examiner

*Primary Examiner* — Dion R Ferguson
(74) *Attorney, Agent, or Firm* — Lex IP Meister, PLLC

(57) ABSTRACT

Disclosed in that an electrode composition including active carbon and a hardening polymer binder, a cured material of the composition, an electrode including the cured material, a supercapacitor including the electrode, and a method of manufacturing a supercapacitor.

11 Claims, 4 Drawing Sheets

ELECTRODE COMPOSITION FOR SUPERCAPACITOR, ELECTRODE INCLUDING CURED MATERIAL, AND SUPERCAPACITOR INCLUDING ELECTRODE

CROSS-REFERENCE TO RELATED APPLICATION

This application claims priority to and the benefit of Korean Patent Application No. 10-2013-0035016 filed in the Korean Intellectual Property Office on Apr. 1, 2013, the entire contents of which are incorporated herein by reference.

BACKGROUND OF THE INVENTION (a) Field of the Invention

The present invention relates to an electrode composition for a supercapacitor, an electrode including a cured material, and a supercapacitor including the electrode.

(b) Description of the Related Art

A capacitor is one of energy storage devices. The capacitor storages electricity by forming a charge ion layer at both ends of an electrode, when a dielectric material is positioned between two metal plates which are apart by a predetermined distance, and the voltage is applied. At this time, the electricity may be simply generated by an electric double layer, rather than the chemical reaction which generates the electricity in batteries. Accordingly, the electrode is not damaged during the electricity generation of the capacitor, so that it has an almost unlimited cycle-life characteristic. Furthermore, times for charging and discharging are not long so that a large amount of current may be stored for a short time. Therefore, the capacitor is an important electricity storage device when high power is required.

The capacitor has one disadvantage relating to poor electricity storage ability. The storage capacity of the capacitor is inversely proportional to the distance between the two plates and is proportional to the area of the two plates. Therefore, the storage capacity may be increased by increasing an area of the electrodes if the distance is fixed. However, there is no advantage in merely increasing the apparent surface areas since it causes an increase in volume of the device, so it is necessary to increase effective areas. The effective areas may be generally increased by forming minute pores in the electrode.

Thus, the disadvantage may be addressed by using a porous material having a large effective area and having low electric resistance as an electrode material. Furthermore, it is required for the material that good conductivity allows to reduce Joule's heat, thereby lowering energy consumption. Active carbon may be conventionally used as the material to satisfy the above requirements. Active carbon has a large effective surface since it has abundant pores formed during carbonization, and has good conductivity so that it is widely used in the industrial purposes.

The supercapacitor is a capacitor (condenser) of which the electrical capacity is mainly improved and is used as a battery. The capacitor used in an electronic circuit acts as a rechargeable battery. That is, the capacitor is used to store electricity and to emit, if necessary, and is an essential component for stable working of an electronic circuit.

The supercapacitor includes electrodes and an electrolyte layer between the electrodes, and forms an electric double layer on the electrode and the electrolyte.

The electrode includes active carbon as a main component, and active carbon includes a carbonaceous material with an extreme high surface area and has suitable structure to form the electric double layer with ions of the electrolyte due to the high surface area and the electrical conductivity of the carbon itself.

However, the active carbon generally has a hydrophobic property at the surface of the carbon. The electrode includes a hydrophobic polymer binder such as polyvinylidene fluoride, and the electrolyte has a hydrophilic property since it has water-solubility. Thus, it is difficult to form an effective electric double layer.

Studies for forming an effective electric double layer are investigated by bonding hydrophilic functional groups such as —COOH, —OH, etc., to a surface of the active carbon to prepare a functional active carbon.

However, the functional active carbon has disadvantages in that it may be easily dissolved in the water-solubility electrolyte, since it has hydrophilicity at a surface.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides an electrode composition in which the functional active carbon is not dissolved in the electrolyte.

Another embodiment of the present invention provides an electrode including the cured material.

Yet another embodiment of the present invention provides a supercapacitor including the electrode.

According to an embodiment of the present invention, an electrode composition including an active carbon and a hardening polymer binder is provided.

According to an embodiment, the active carbon may include a hydrophilic functional group.

The hydrophilic functional group may be at least one selected from —COOH, —OH, —SO$_3$H, —NH$_2$, —NH$_4$, —SO$_3$, —COOM, wherein M is an alkali metal or NH$_4$, =O, or —CO.

The hardening polymer binder may be at least one selected from a thermosetting polymer binder or a photo-curable polymer binder.

The hardening polymer may have a hydrophilic functional group. In one embodiment, the hardening polymer binder may be a compound represented by Formula 1.

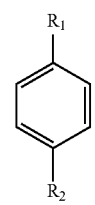

[Formula 1]

wherein, R$_1$ is a C1 to C10 alkyl, a C6 to C18 aryl, or (—CH$_2$CH—)$_n$, wherein n is an integer of 1 to 20,000, R$_2$ is —OH, —COOH, —SO$_3$H, —NH$_2$, —NH$_4$, —SO$_3$, —COOM, =O or —CO, and M is an alkali metal or NH$_4$.

In another embodiment, the hardening polymer binder may be a compound represented by Formula 2.

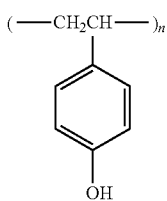

[Formula 2]

wherein, n is an integer of 1 to 30,000.

According to another embodiment, the electrode composition may further include a cross-linking agent and a solvent.

The cross-linking agent may be a compound represented by Formula 3.

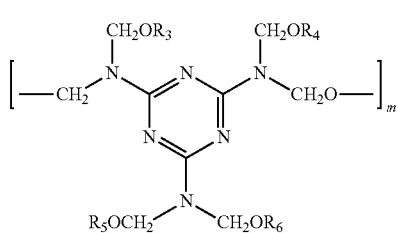

[Formula 3]

wherein, $R_3$ to $R_6$ are the same or are independently hydrogen, a C1 to C10 alkyl, or a C6 to C18 aryl, and m is an integer of 1 to 1000.

The solvent may be a compound represented by Formula 4.

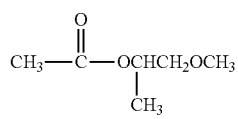

[Formula 4]

In the electrode composition, the total amount of the hardening polymer binder and the cross-linking agent may be 1 part by weight to 100 parts by weight based on 100 parts by weight of the active carbon.

The total amount of the active carbon, the hardening polymer binder, and the cross-linking agent may be 0.01 w/v % to 10 w/v % based on the amount of the solvent.

Still another embodiment provides an electrode including a cured material by curing the composition.

Still another embodiment provides a supercapacitor including: a pair of current collectors; a pair of electrodes each formed on one of the current collectors, the electrodes positioned facing each other and including the cured material; an electrolyte layer between the electrodes; and a separator between the electrolyte layers.

In the present invention, a hardening polymer binder is used to overcome a shortcoming of the functional active carbon. The use of the hardening polymer binder allows inking of the functional active carbon so that the resulting material may be applicable for various coating techniques (generally all coating techniques).

The hardening polymer binder may effectively prevent the dissolution the functional active carbon to the electrolyte, since the hardening polymer binder forms a network having a three-dimensionally cross-linked structure. The network derived from the hardening polymer binder does not dissolve and only swells in the electrolyte, so that an electrode of a supercapacitor using the hardening polymer binder may form a maximal electric double layer by swelling the electrolyte, and provides good performance.

Conductivity of the electrode of the supercapacitor may be guaranteed via the network derived from the hardening polymer binder without a conductive material. The functional active carbon having hydrophilicity at a surface has good affinity to the aqueous electrolyte so that the formation of the electric double layer may be maximized. The hardening polymer binder may prevent the dissolution of the functional active carbon to the aqueous electrolyte since the hardening polymer binder forms a network. The hardening polymer binder may provide sufficient conductivity without a conductive material by decreasing distances between the functional active carbon since the hardening polymer binder forms a network.

DETAILED DESCRIPTION OF THE INVENTION

Figure 1:
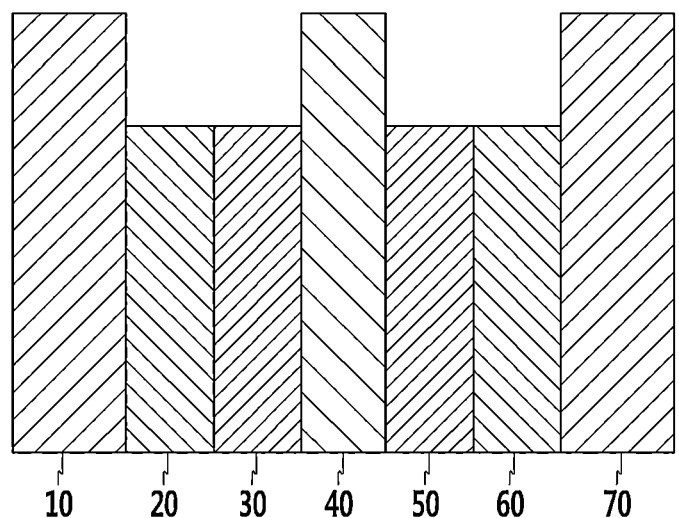
FIG. 1 is a cross-sectional view showing a structure of a supercapacitor.

Hereinafter, the present invention will be illustrated in more detail.

The present invention relates to an electrode composition for a supercapacitor, a cured material of the composition, an electrode including the cured material, a supercapacitor including the electrode, and a method of manufacturing the supercapacitor.

The electrode composition according to one embodiment may include an active carbon and a hardening polymer binder. The electrode composition may further include a cross-linking agent and a solvent. According to another embodiment, the electrode composition may include an active carbon, the hardening polymer binder, the cross-linking agent, and the solvent.

The active carbon is a main component of the electrode composition, and is a porous material having a large effective area, good conductivity, and low electrode resistance. The active carbon may be a nanopowder, for example a nanopowder with a size of about 1 nm to about 1000 nm.

The active carbon may preferably be a functional active carbon. The functional active carbon is active carbon of which a surface is introduced with a hydrophilic functional group. That is, the functional active carbon includes the hydrophilic functional group at the surface. The hydrophilic functional group may be at least one selected from —COOH, —OH, —SO$_3$H, —NH$_2$, —NH$_4$, —SO$_3$, —COOM, wherein M is an alkali metal or NH$_4$, =O, or —CO. The active carbon introduced with the hydrophilic functional group may be active carbon with one or more of one type of hydrophilic functional group, or with various types of hydrophilic functional groups.

When the hydrophilic functional group is introduced into the surface of the active carbon, that is, the functional active carbon is prepared, it is suitable for forming an effective electric double layer.

The hardening polymer binder acts to form a cured material when the electrode composition is cured, and particularly, acts to form a network of a three-dimensionally cross-linked structure in the cured material.

The hardening polymer binder may be at least thermosetting polymer binder or photo-curable polymer binder. For example, one type of the thermosetting polymer binder may be used, or various types of the thermosetting polymer binder may be used. Alternatively, one type of the photo-curable polymer binder may be used, or various types of the photo-curable polymer binder may be used. As a further alternative one type or various types of the thermosetting polymer binder may be used together with one type or various types of the thermosetting polymer binder.

The hardening polymer binder may include a hydrophilic functional group. The hydrophilic functional group may be at least one selected from —COOH, —OH, —SO$_3$H, —NH$_2$, —NH$_4$, —SO$_3$, —COOM, wherein M is an alkali metal or NH$_4$, =O, or —CO. When the hardening polymer binder with the hydrophilic functional group is used, it is preferable for forming an effective network and more preferably an effective electric double layer.

The hardening polymer binder may have a weight average molecular weight (Mw) of about 500 to about 500,000.

In one embodiment, the hardening polymer binder including the hydrophilic functional group may be a compound represented by Formula 1.

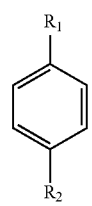

[Formula 1]

wherein, R$_1$ is a C1 to C10 alkyl, a C6 to C18 aryl, or (—CH$_2$CH—)$_n$, wherein n is an integer of 1 to 20,000, R$_2$ is —OH, —COOH, —SO$_3$H, —NH$_2$, —NH$_4$, —SO$_3$, —COOM, =O or —CO, and M is an alkali metal or NH$_4$.

In another embodiment, the hardening polymer binder including the hydrophilic functional group may be a compound represented by Formula 2.

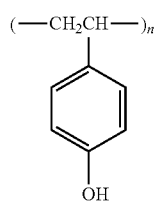

[Formula 2]

wherein, n is an integer of 1 to 30,000.

The compound represented by Formula 2 is poly(4-vinylphenol) (hereinafter referred to as "PVP"). The PVP may have a weight average molecular weight (Mw) of about 100,000 or less or of about 500 to about 100,000. Furthermore, the weight average molecular weight (Mw) of PVP may be about 50,000 or less or about 5000 to about 50,000.

The cross-linking agent binds with the hardening polymer binder to form a network of a three-dimensionally cross-linked structure in the cured material. The cross-linking agent is not limited, but may be one having an average molecular weight (Mn) of about 50 to about 500,000.

In one embodiment, the cross-linking agent may be a compound represented by Formula 3.

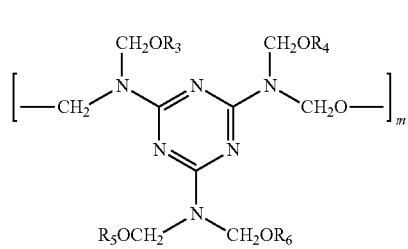

[Formula 3]

wherein, R$_3$ to R$_6$ are the same or are independently hydrogen, a C1 to C10 alkyl, or a C6 to C18 aryl, and m is an integer of 1 to 1000. In one embodiment, R$_3$ to R$_6$ are independently hydrogen or methyl.

In another embodiment, the compound represented by Formula 3 may be (poly(melamine-co-formaldehyde), methylated) and may have a number average molecular weight (Mn) of 10,000 or less, or about 400 to about 10,000. The number average molecular weight (Mn) of poly(melamine-co-formaldehyde), methylated may be about 1000 or less, or about 400 to about 1000.

The solvent makes the components used in the electrode composition enter a dissolution state and/or a distribution state, in order to manufacture an electrode using coating techniques. The solvent is not limited, but may be a compound represented by Formula 4.

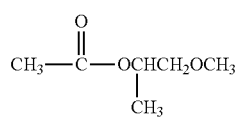

[Formula 4]

The compound represented by Formula 4 is propylene glycol methyl ether acetate.

In the electrode composition, the total weight of the hardening polymer binder and the cross-linking agent may be 100 parts by weight or less based on 100 parts by weight of the active carbon. That is, the hardening polymer binder and the cross-linking agent may be used in an amount of the same or less than the amount of the active carbon. The total weight, i.e., mixed amount of the hardening polymer binder and the cross-liking agent may be about 1 part by weight to 100 parts by weight based on 100 parts by weight of the active carbon, preferably, 1 part by weight to 50 parts by weight. If the total amount of the hardening polymer binder and the cross-linking agent is extremely smaller than that of the active carbon, the active carbon may be separated from the resulting electrode. If the total amount of the hardening polymer binder and the cross-linking agent is extremely higher than that of the active carbon, conductivity is decreased and the electrode resistance is increased. The hardening polymer binder may act as a binder together with the cross-linking agent, so that the total amount of the hardening polymer binder and the cross-linking agent is critical, but the mixing ratio of the hardening polymer binder and the cross-linking is not critical, and may be suitably controlled in the above range.

In the electrode composition, the total amount of the active carbon, the hardening polymer binder, and the cross-linking agent may be 10 w/v % or less based on the amount of the solvent. That is, the electrode composition mainly includes the solvent, and the balance of the remaining components except for the solvent may be about 0.01 w/v % to 10 w/v %, preferably 0.1 w/v % to 5 w/v %, and more preferably 0.5 w/v % to 2 w/v %. If the balance is extremely small, it is difficult to prepare the electrode or the cured material, or the physical properties are deteriorated. If the balance is extremely large, the coating is not performed well or the physical properties are deteriorated.

Another embodiment provides a cured material by curing the composition. The cured material is cured due to heat or light. The hardening polymer binder in the cured material may form a network having a three-dimensionally cross-linked structure in the cured material. That is, the hardening polymer binder in the cured material has characteristics for forming a network of the three-dimensionally cross-linked structure together with the cross-linking agent. Such a three-dimensionally cross-linked structure may prevent the dissolution of the functional active carbon by the electrolyte which is a shortcoming of the conventional art.

Furthermore, another embodiment provides an electrode including the cured material. The electrode for a supercapacitor may prevent the separation of the functional active carbon from the electrode since the electrode is formed by the cured material.

Another embodiment provides a supercapacitor including: a pair of current collectors; a pair of electrodes each formed on one of the current collectors, the electrodes positioned facing each other and including the cured material; an electrolyte layer between the electrodes; and a separator between the electrolyte layers.

As shown in FIG. 1, the supercapacitor may include a pair of current collectors 10 and 70, a pair of electrodes 20 and 60, a pair of electrolyte layers 30 and 50, and a separator 40.

The current collectors 10 and 70 may be formed by using a metal, glass, or plastics, or may be transparent. For example, the current collector may be formed by using aluminum, nickel, copper, SUS, iron, silver, gold, platinum, transparent indium tin oxide, (poly(3,4-ethylenedioxythiophene)/poly (styrenesulfonate), etc. In addition, the current collector may be wire or a substrate coated with a coating layer. The wire or the coating layer may include Ag, Au, Al, Ni, Co, Cu, Pt, or conductive materials such as graphene, carbon nano tube (CNT), or a metal complex, and the substrate may be polyethylene terephthalate, polyimide, or glass.

The electrodes 20 and 60 are formed on each of the pair of current collectors 10 and 70, and more specifically, the electrode 20 and 60 are positioned facing each other between the current collectors 10 and 70. As described above, the electrodes 20 and 60 include the cured material of the electrode composition according to one embodiment.

The thickness of the electrodes 20 and 60 is not limited and may be suitably controlled by controlling the coating cycles (number of coats). For example, an electrode with an average thickness of about 2 μm or less, preferably 10 nm to 1500 nm, and more preferably 100 nm to 1000 nm may be formed as each coating. More specifically, if an electrode with an average thickness of 0.8±0.5 μm is formed for one coating cycle, six coating cycles gives an electrode with an average thickness of 5±1 μm.

The thickness of the electrodes 20 and 60 is inversely proportional to the transparency. Thus, as the thickness of the electrodes 20 and 60 increases, the transparency decreases, and as the thickness of the electrodes 20 and 60 decreases, the transparency increases. The electrodes 20 and 60 having a thickness of 2 μm or less may be transparent or translucent. In the application, the transparency refers to one having light transmittance of more than 70%, the translucency refers to one having light transmittance of 30% to 70%, and the opaque refers to one having light transmittance of less than 30%. The transparent or translucent electrode may be obtained by coating the electrode once or twice to control the thickness thereof to be about 2 μm or less. On the contrary, if the coating is repeated 5 times or more, the electrode material is full covered on the electrode, and the resulting electrode is opaque.

The electrolyte layers 30 and 50 may be formed by injecting the electrolyte between the pair of electrodes 20 and 60.

The electrolyte layer may be an aqueous electrolyte. The aqueous electrolyte may include an electrolytic salt and a solvent. The electrolytic salt may be any electrolytic salt as long as it may be useful in the aqueous electrolyte, and examples thereof may be an acidic electrolytic salt, a neutral electrolytic salt, or a basic electrolytic salt. Exemplary of the electrolytic salt may be potassium hydroxide, potassium chloride, sodium sulfate, or sulfuric acid, or a combination thereof, with high ion conductivity.

The solvent may be water. The electrolyte has a concentration of about 0.1 M to about 6 M.

The separator 40 is position between the pair of electrodes 20 and 60, that is, is formed between the electrolyte layers 30 and 50. The separator 40 may be a porous separator having a plurality of pores, and each pore has a sufficient size to pass only electrolyte. The separator may include cellulose, polyolefin, celgard S-20, rayon, etc.

Furthermore, one embodiment provides a method of manufacturing the supercapacitor. The method includes coating a composition on each of a pair of the current collectors, curing the composition to form two electrodes, injecting the electrolyte between the electrodes, inserting a separator into the electrolyte, and sealing the resultant. The composition includes active carbon, a hardening polymer binder, and a cross-linking agent. In the method of manufacturing, the coating numbers may be controlled in order to control transparency and thickness of the electrode.

First, an electrode composition including active carbon, a hardening polymer binder, a cross-linking agent, and a solvent is coated on each of a pair of current collectors. The coating process may be a general technique such as spray coating, slot-die coating, bar coating, and blade coating, but it is not limited thereto.

As described above, the thickness and the transparency of the electrode may be controlled according the control of coating cycles.

Thereafter, the coated electrode composition is cured to prepare a pair of electrodes 20 and 60 facing each other. The curing may be thermosetting and/or photo-curing, and for example, the thermosetting may be performed at 150° C. to 200° C., and the photo-curing may be performed by irradiating ultraviolet rays.

An electrolyte solution is injected between the two electrodes 20 and 60 to prepare electrolyte layers 30 and 50. The electrolyte solution includes an electrolytic salt with high conductivity such as potassium hydroxide, potassium chloride, sodium sulfate, sulfuric acid, or a combination thereof, and a solvent such as water.

Thereafter, the separator 40 is inserted between the electrolyte layers 30 and 50 which are located between the electrodes 20 and 60 to prevent direct contact between the two electrodes 20 and 60.

A supercapacitor is manufactured by sealing for inhibiting leakage of the electrolyte solution.

In the present invention, the hardening polymer binder is used to overcome a shortcoming of the functional active carbon The use of the hardening polymer binder allows inking of the functional active carbon so that the resulting material may be applicable for various coating techniques (generally all coating techniques). The hardening polymer binder may effectively prevent the dissolution of the functional active carbon by the electrolyte, since the hardening polymer binder forms a network having a three-dimensionally cross-linked structure. The network derived from the hardening polymer binder does not dissolve and only swells in the electrolyte, so that an electrode of a supercapacitor using the hardening polymer binder may form a maximal electric double layer by swelling the electrolyte, and provides good performance. Conductivity of the electrode of the supercapacitor may be guaranteed via the network derived from the hardening polymer binder without a conductive material. The functional active carbon having hydrophilicity at a surface thereof has good affinity to the aqueous electrolyte so that the formation of the electric double layer may be maximized. The hardening polymer binder may prevent the dissolution of the functional active carbon by the aqueous electrolyte since the hardening polymer binder forms a network. The hardening polymer binder may provide sufficient conductivity without a conductive material by decreasing the distances between the functional active carbon since the hardening polymer binder forms a network.

Examples 1 to 6

An electrode composition was coated on each of a pair of current collectors to prepare electrodes. The electrode composition included active carbon, a hardening polymer binder, a cross-linking agent, and a solvent.

The electrode composition was prepared by adding 1 g of active carbon nanopowder to 100 ml of a solvent, and adding the hardening polymer binder and the cross-linking agent thereto. The total amount of the hardening polymer binder and the cross-linking agent are shown in Table 1, within a range of 0.01 g to 1 g. The active carbon was a function active carbon nanopowder including —OH, —COOH, —CO, and =O as hydrophilic functional groups, and the hardening polymer binder was PVP (Mw: 20,000), the cross-linking agent was poly(melamine-co-formaldehyde) (Mn: ~511), and the solvent was propylene glycol methyl ether acetate.

The coating process was performed by spray coating, and was repeated for 5 cycles. Thereafter, the coated electrode composition was thermoset at 1800° C. to prepare a pair of electrodes facing each other, and an electrolyte solution was injected between the two electrodes to prepare an electrolyte layer. The electrolyte solution was 1 M sodium sulfate in water. Thereafter, a porous separator was inserted into the electrolyte located between two electrodes, and sealed to manufacture a supercapacitor.

Experiment

For the supercapacitors according to Examples 1 to 6, tests for whether or not active carbons were detached from the electrodes, according to the total amounts of the hardening polymer binders (PVP) and the cross-linking agents, were performed. The tests were performed on a three-electrode system including a Pt mesh counter electrode, an Ag/AgCl (3M KCl) reference electrode, and the electrodes according to Examples 1 to 6, at a scan rate of 1000 mV/s for 50 cycles. The results were obtained from eye observation. The results are shown in Table 1.

TABLE 1

| | Amount of active carbon(g) | Total amount of binder and cross-linking agent (g) | Detachable of active carbon |
|---|---|---|---|
| Example 1 | 1 | 0.01 | Detached |
| Example 2 | 1 | 0.02 | Detached |
| Example 3 | 1 | 0.05 | Not detached |
| Example 4 | 1 | 0.1 | Not detached |
| Example 5 | 1 | 0.5 | Not detached |
| Example 6 | 1 | 1 | Not detached |

As shown in Table 1, Examples 1 and 2 using 0.01 g or 0.02 g of the total amount of the binder and the cross-linking agent exhibited detached active carbon.

Figure 2:
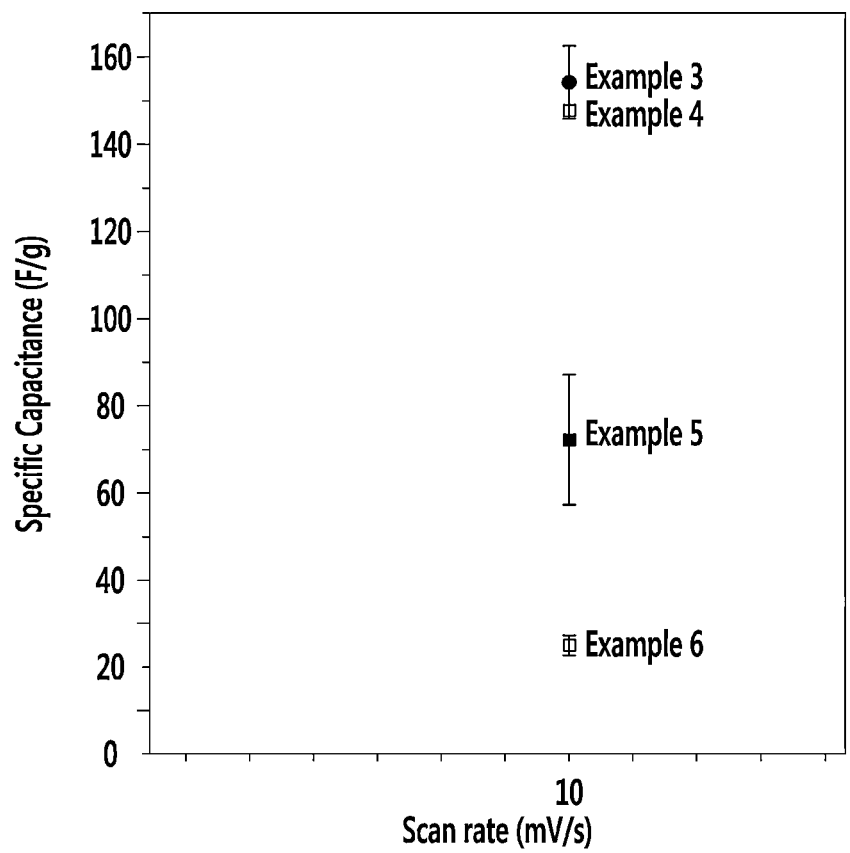
FIG. 2 is a graph showing the charging capacitance depending on the amounts of the hardening polymer binder (PVP) and the cross-linking agent.

The charging capacities according to the total amount of the hardening polymer binder (PVP) and the cross-linking agent were measured on the supercapacitors according to Examples 3 to 6. The results are shown in FIG. 2. As shown in FIG. 2, as the amount of the binder and the cross-linking agent decreased, the charge capacity increased. From the results in Table 1 and FIG. 2, it can be seen that the amount of the binder and the cross-linking agent is as little as possible within the range (0.05 g or more) in which active carbon was not detached from the electrode, to increase charge capacity.

Example 7

A supercapacitor was manufactured by the same procedures in Example 3 except that the coating was performed once.

Example 8

A supercapacitor was manufactured by the same procedures in Example 3 except that the coating was performed twice.

Example 9

A supercapacitor was manufactured by the same procedures in Example 3 except that the coating was performed three times.

Example 10

A supercapacitor was manufactured by the same procedures in Example 3 except that the coating was performed four times.

Example 11

A supercapacitor was manufactured by the same procedures in Example 3 except that the coating was performed six times.

Figure 3:
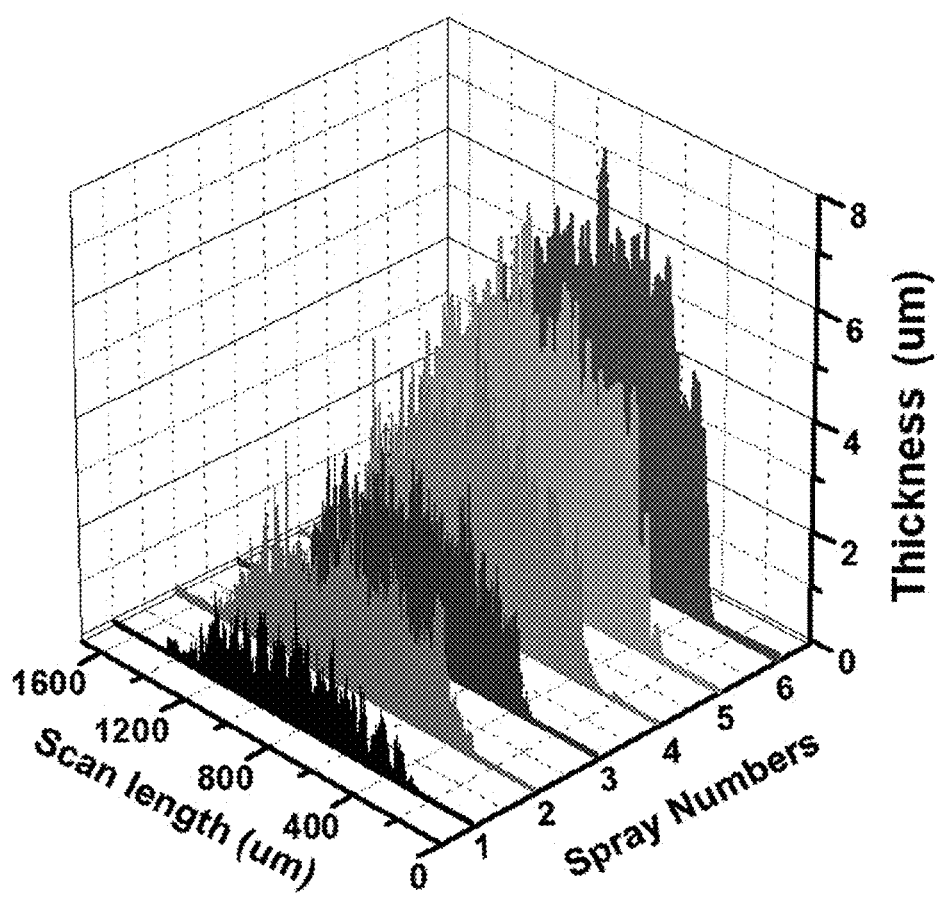
FIG. 3 is a graph showing thickness of the electrode according to the coating cycles.

The thickness of the electrode according to Examples 7 and 11 were measured in order to confirm the thickness variation according to the coating cycles. Furthermore, the thickness of the electrode according to Example 3 was measured. The results are shown in FIG. 3. It can be seen from FIG. 3 that as the coating cycles were increased, the thickness of the electrode was thicker, and when coating was repeated once, the average thickness of about 0.8±0.5 µm was determined.

Figure 4:
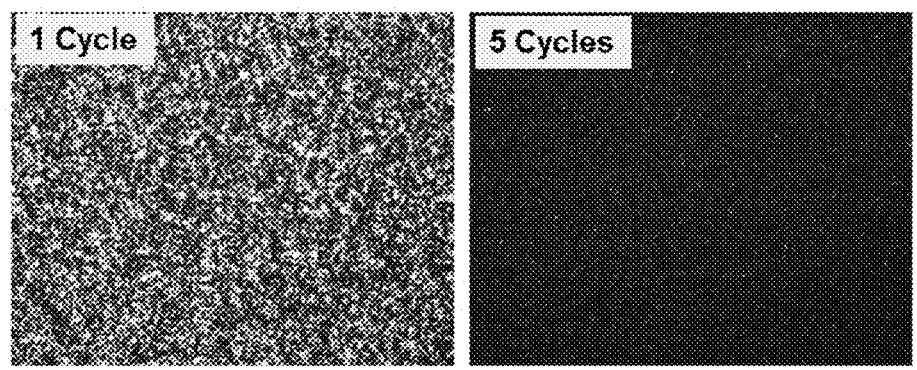
FIG. 4 shows photographs of the electrode according to the coating cycles.

FIG. 4 shows photographs of the electrodes according to Example 7 and Example 3, according to the coating cycles. As shown in FIG. 4, when the coating procedure was performed once, the transparent or translucent electrode was prepared, whereas when the coating procedure was performed for 5 cycles or more, the electrode material was full covered.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode composition comprising: an active carbon; and a hardening polymer binder, wherein the hardening polymer binder is a compound represented by Formula 1:

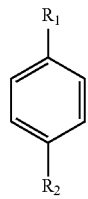

[Formula 1]

wherein, R1 is a C1 to C10 alkyl, a C6 to C18 aryl, or (—CH2QCH—), n is an integer of 1 to 20,000, R2 is —OH, —COOH, —SO3H, —NH2, —NH4, —SO3, —COOM, =0 or —CO, and M is an alkali metal or NH4; a cross-linking agent and a solvent; wherein a total weight of the active carbon, the hardening polymer binder, and the cross-linking agent is 0.01 w/v % to 10 w/v % based on an amount of the solvent.

2. The electrode composition of claim 1, wherein the active carbon and the hardening polymer binder include a hydrophilic functional group.

3. The electrode composition of claim 2, wherein the hydrophilic functional group is at least one selected from —COOH, —OH, —SO$_3$H, —NH$_2$, —NH$_4$, —SO$_3$, —COOM, wherein M is an alkali metal or NH$_4$, =O, or —CO.

4. The electrode composition of claim 1, wherein the hardening polymer binder is a compound represented by Formula 2:

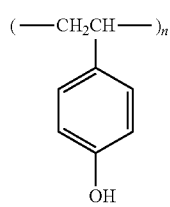

[Formula 2]

wherein,
n is an integer of 1 to 30,000.

5. The electrode composition of claim 1, wherein the cross-linking agent is a compound represented by Formula 3:

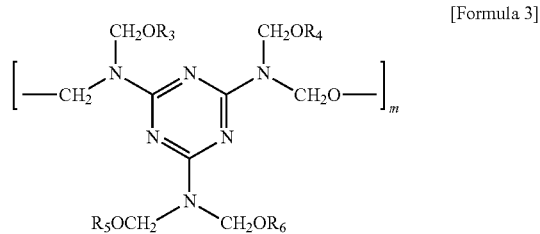

[Formula 3]

wherein,

R$_3$ to R$_6$ are the same or are independently hydrogen, a C1 to C10 alkyl, or a C6 to C18 aryl, and m is an integer of 1 to 1000.

6. The electrode composition of claim 1, wherein the solvent is a compound represented by Formula 4:

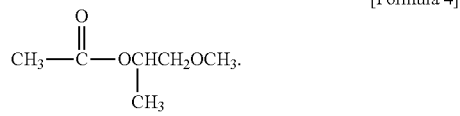

[Formula 4]

7. The electrode composition of claim 1, wherein a total weight of the hardening polymer binder and the cross-linking agent is 1 part by weight to 100 parts by weight based on 100 parts by weight of the active carbon.

8. The electrode composition of claim 1, wherein a total weight of the hardening polymer binder and the cross-linking agent is 1 part by weight to 50 parts by weight based on 100 parts by weight of the active carbon.

9. An electrode comprising a cured material by curing the composition according to claim 1.

10. A supercapacitor comprising:

a pair of current collectors;

a pair of electrodes each formed on the current collectors, the electrodes positioned facing each other, and comprising the cured material according to claim 9, an electrolyte layer between the electrodes; and a separator between the electrolyte layers.

11. The supercapacitor of claim 10, wherein the electrode has a thickness of about 1 nm to 2 µm and is transparent or translucent.

* * * * *